United States Patent
He et al.

(10) Patent No.: US 10,924,357 B2
(45) Date of Patent: Feb. 16, 2021

(54) METHOD AND DEVICE FOR DETERMINING RESOURCE UTILIZATION

(71) Applicant: Telefonaktiebolaget LM Ericsson (publ), Stockholm (SE)

(72) Inventors: Jiang He, Beijing (CN); Ke Yi, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 42 days.

(21) Appl. No.: 16/309,702

(22) PCT Filed: Jun. 20, 2016

(86) PCT No.: PCT/CN2016/086344
§ 371 (c)(1),
(2) Date: Dec. 13, 2018

(87) PCT Pub. No.: WO2017/219173
PCT Pub. Date: Dec. 28, 2017

(65) Prior Publication Data
US 2019/0140912 A1   May 9, 2019

(51) Int. Cl.
*H04L 12/24* (2006.01)
*H04L 12/26* (2006.01)

(52) U.S. Cl.
CPC ........ *H04L 41/147* (2013.01); *H04L 43/0817* (2013.01); *H04L 43/0876* (2013.01)

(58) Field of Classification Search
CPC combination set(s) only.
See application file for complete search history.

(56) References Cited

U.S. PATENT DOCUMENTS

| | | | |
|---|---|---|---|
| 5,884,037 A | * | 3/1999 | Aras ............. H04L 47/741 709/226 |
| 2014/0192683 A1 | | 7/2014 | Hallivuori et al. |
| 2014/0233389 A1 | | 8/2014 | Bantukul et al. |
| 2015/0142962 A1 | | 5/2015 | Srinivas et al. |
| 2015/0271043 A1 | * | 9/2015 | Htay ............ H04L 41/147 709/224 |
| 2017/0109422 A1 | * | 4/2017 | Satkunarajah ...... G06T 17/05 |

(Continued)

FOREIGN PATENT DOCUMENTS

| | | |
|---|---|---|
| CN | 104363159 A | 2/2015 |
| CN | 205071038 U | 3/2016 |
| CN | 105577729 A | 5/2016 |

OTHER PUBLICATIONS

Extended European Search Report for European Application 16905715.5 dated Oct. 15, 2019, 8 pages.

(Continued)

*Primary Examiner* — El Hadji M Sall
(74) *Attorney, Agent, or Firm* — Sage Patent Group (57) ABSTRACT

Embodiments of the disclosure generally relate to determination of resource utilization in SDN. An SDN controller sends a query to an application layer. The query is as to utilization of a resource to be used in a network infrastructure, and the resource does not include a bandwidth resource. The prediction is then determined at the application layer based on raw utilization information in response to the query. Then, the SDN controller receives the prediction from the application layer.

10 Claims, 4 Drawing Sheets

(56) References Cited

U.S. PATENT DOCUMENTS

2017/0126792 A1* 5/2017 Halpern .............. H04L 41/0896

OTHER PUBLICATIONS

Banse Christian et al., "A Secure Northbound Interface for SDN Applications", 2015 IEEE Trustcom/BigDataSE/ISPA, IEEE, vol. 1, Aug. 20, 2015 (Aug. 20, 2015), pp. 834-839, XP032819735.
PCT International Search Report for International application No. PCT/CN2016/086344—dated Mar. 20, 2017.
SDN Architecture Overview; Open Networking Foundation; Version 1.0—Dec. 12, 2013.
Software-Defined Networking (SDN); Layers and Architecture Terminology; Internet Research Task Force (IRTF) by E. Haleplidis, ed. et al.—Jan. 2015.

* cited by examiner

METHOD AND DEVICE FOR DETERMINING RESOURCE UTILIZATION

PRIORITY

This nonprovisional application is a U.S. National Stage Filing, under 35 U.S.C. § 371 of International Patent Application Serial No. PCT/CN2016/086344 filed Jun. 20, 2016, and entitled "METHOD AND DEVICE FOR DETERMINING RESOURCE UTILIZATION" which is hereby incorporated by reference in its entirety.

TECHNICAL FIELD

Embodiments of the present disclosure generally relate to the field of communications, and more particularly, to a method and device for determining resource utilization in Software-Defined Networking (SDN).

BACKGROUND

SDN is an approach to networking that enables applications to communicate with and manipulate the control software of network devices and resources, such as energy, computing, storage and networking. Unlike being statically planned in conventional networks, in SDN, service functions with corresponding resources can be dynamically arranged in place to realize optimized flow steering and computing utilization in a variety of network scenarios, such as data centers, campuses, and carrier environments.

The SDN generally includes three layers, namely, an application layer, a control layer and a forwarding layer, which may be named as 'application plane', 'controller plane' and 'data plane' according to Open Networking Foundation (ONF), or correspondingly as 'application layer', 'SDN control layer' and 'resource layer' according to International Telecommunication Union (ITU), or as 'application plane', 'control plane' and 'forwarding plane' according to Internet Engineering Task Force (IETF). The application layer supports service(s) and/or application(s) and may be used by business and operator applications to provide new service requests and/or policies to the control layer. The control layer, sometimes implemented as an SDN controller, controls and/or manages communication in the forwarding layer (also referred to as "network infrastructure") in a centralized manner. The forwarding layer includes a plurality of network devices conducting communication with each other according to instructions from the SDN controller.

In SDN, the control layer and the forwarding layer communicate via an interface, which may be referred to as a southbound interface sometimes, using protocols, such as Forwarding and Control Element Separation (ForCES), Network Configuration Protocol (NETCONF), and Interface to the Routing System (I2RS). Through the southbound interface, the control layer may manage the forwarding layer's behavior, for example, by manipulating corresponding forwarding tables. The control layer communicates with the application layer via another interface, which may be referred to as a northbound interface sometimes, using protocols, such as REST (REpresentational State Transfer) protocols, Thrift protocol, and the like. Many benefits of SDN can be derived from the capability of the control layer to communicate with other components in an open and standardized manner.

Network resource utilization is a vital factor to reflect actual network behavior and pattern. In traditional carrier networks, most attention is paid to bandwidth resource utilization. However, with more fine-grained and dynamic traffic control introduced in SDN scenarios, the limitation in resource capacity of network devices becomes a bottleneck for further development. For example, a typical problem is that the bandwidth resource is still enough but other resources, like energy, computing, or storage, inside a network device is already exhausted or oversubscribed.

SUMMARY

Conventionally, the SDN does not perform resource utilization prediction and/or adjustment. As such, unexpected network behavior may occur when resources are oversubscribed, for example, due to an invisible relationship between a traffic pattern and corresponding resource consumption, network resource limitation in a legacy network/node with statically planned deployment of network services, malicious attacks aiming at vital network resources, and so on.

In general, embodiments of the present disclosure provide a solution for determining resource utilization in SDN to provide a predication of the resource utilization as needed.

In a first aspect, a method at least partially implemented at an SDN controller is provided. The SDN controller sends a query to an application layer. The query is related to utilization of a resource to be used in a network infrastructure, and the resource does not include a bandwidth resource. A prediction for the resource utilization is then determined at the application layer based on raw utilization information in response to the query. Then, the SDN controller receives the prediction from the application layer. The corresponding computer program is also provided.

In one embodiment, the method may further comprise providing the raw utilization information to the application layer. The raw utilization information may include at least one of: utilization of a resource used by a historical operation, utilization of a resource for a historical time duration, utilization of a resource associated with a bandwidth, utilization of a resource at a temperature, and utilization of resource associated with certain humidity.

In one embodiment, the method may further include generating the query as to at least one of: utilization of a resource to be used by a target operation to be performed in the network infrastructure, utilization of a resource to be used at a target time point, utilization of a resource to be used in association with a target bandwidth, utilization of a resource to be used in association with a target temperature, and utilization of a resource to be used in association with a target humidity.

In one embodiment, the method may further include receiving information associated with the prediction of the utilization of the resource from the application layer. The information may include at least one of: an identification of a target operation using the resource, a start time point of the target operation, an end time point of the target operation, a time duration of the target operation, a frequency band to be used by the target operation, a target time point when the resource is to be used, a target bandwidth, a target temperature and a target humidity.

In one embodiment, the method may further include determining operability of a target operation using the resource based on the prediction of the utilization of the resource. The operability may indicate whether the target operation is suitable to be performed. The method may also comprise sending an indication of the operability of the target operation to the network infrastructure.

In one embodiment, the resource may include at least one of: energy, computing capability and storage.

In a second aspect, a method at least partially implemented at a device in an application layer is provided. According to this method, the device determines, in response to receipt, at the application layer, of a query as to utilization of a resource other than a bandwidth resource from an SDN controller, a prediction of the utilization of the resource based on raw utilization information. The resource is to be used in a network infrastructure. Then, the device sends the prediction of the utilization of the resource to the SDN controller. The corresponding computer program is also provided.

In one embodiment, the prediction of the utilization of the resource may be determined according to a resource knowledge repository. The resource knowledge repository may be constructed from machine learning on the raw utilization information received from the SDN controller. The raw utilization information may include at least one of: utilization of a resource used by a historical operation, utilization of a resource for a historical time duration, utilization of a resource associated with a bandwidth, utilization of resource at a temperature, and utilization of a resource associated with certain humidity.

In one embodiment, the method may further include determining information associated with the prediction of the utilization of the resource based on the resource knowledge repository and then sending the information to the SDN controller. The information may include at least one of: an identification of a target operation using the resource, a start time point of the target operation, an end time point of the target operation, a time duration of the target operation, a frequency band to be used by the target operation, a target time point when the resource is to be used, a target bandwidth, a target temperature and target humidity.

In one embodiment, the resource includes at least one of: energy, computing capability and storage.

In a third aspect, an SDN controller is provided. The SDN controller includes a transmitter and a receiver. The transmitter is configured to send, to an application layer, a query as to utilization of a resource other than a bandwidth resource. The resource is to be used in a network infrastructure. The receiver is configured to receive a prediction of the utilization of the resource from the application layer. The prediction is determined based on raw utilization information in response to the query.

In a fourth aspect, a device in an application layer is provided. The device includes a processing unit and a transmitter. The processing unit is configured to determine a prediction of the utilization of the resource based on raw utilization information, in response to receipt, at the application layer, of a query as to utilization of a resource other than a bandwidth resource from an SDN controller. The resource is to be used in a network infrastructure. The transmitter is configured to send the prediction of the utilization of the resource to the SDN controller.

In a fifth aspect, an SDN controller is provided. The SDN controller includes a processor and a memory. The memory contains instructions executable by the processor, whereby the processor being adapted to cause the SDN controller to perform the method according to the first aspect of the present disclosure.

In a sixth aspect, a device in an application layer is provided. The device includes a processor and a memory. The memory containing instructions executable by the processor, whereby the processor being adapted to cause the device to perform the method according to the second aspect of the present disclosure.

According to various embodiments of the present disclosure, the SDN controller can have the knowledge of prediction regarding utilization of resource(s) to be used in the network infrastructure and accordingly control/manage operation(s) in the network infrastructure in an effective way. In this way, a potential pattern of resource utilization can be predicted, and thus it is possible to obtain load balancing of network resources and detect malicious resource attacks.

BRIEF DESCRIPTION OF THE DRAWINGS

The above and other aspects, features, and benefits of various embodiments of the disclosure will become more fully apparent, by way of example, from the following detailed description with reference to the accompanying drawings, in which like reference numerals or letters are used to designate like or equivalent elements. The drawings are illustrated for facilitating better understanding of the embodiments of the disclosure and not necessarily drawn to scale, in which.

DETAILED DESCRIPTION

The present disclosure will now be discussed with reference to several example embodiments. It should be understood that these embodiments are discussed only for the purpose of enabling those skilled persons in the art to better understand and thus implement the present disclosure, rather than suggesting any limitations on the scope of the present disclosure.

As used herein, the term "resource" refers to, for example, energy, computing, storage, and/or the like, to support network functions in a network device, but does not include the bandwidth resource. The energy resource may include battery supply, supply of power grid, and so on. The computing resource may include computing capability of a processing unit (for example, a CPU), a network device, and so on. The storage resource may include a space for storing information, data, instructions, forwarding tables, and so on. The forwarding tables may be resources used in packet forwarding, for example, Access Control Lists (ACLs). In SDN, ACLs may be filters that enable a router or switch to control packets permitted or denied in or out of a network. ACLs are used by network administrators to filter traffic and to provide extra security for their networks. A router acts as a packet filter when it forwards or denies packets according to ACL rules. It is to be understood that the above examples of the resource are only described for illustration, rather than limitation. Those skilled in the art will appreciate that the resource of the present disclosure may include many other suitable resources other than the bandwidth resource.

The term "resource utilization" refers to utilization of one or more resources. For example, it may be expressed in the form of an amount of available resources, an amount of residual resources, an amount of occupied resources, a usage percentage of a resource, an available percentage of the resource, or in other suitable forms. For purpose of discussion, the term "resource utilization" may also be referred to as "utilization of a resource" or "utilization of resources" hereafter.

As used herein, the terms "first" and "second" refer to different elements. The singular forms "a" and "an" are intended to include the plural forms as well, unless the context clearly indicates otherwise. The terms "comprises," "comprising," "has," "having," "includes" and/or "including" as used herein, specify the presence of stated features, elements, and/or components and the like, but do not preclude the presence or addition of one or more other features, elements, components and/or combinations thereof. The term "based on" is to be read as "based at least in part on." The term "one embodiment" and "an embodiment" are to be read as "at least one embodiment." The term "another embodiment" is to be read as "at least one other embodiment." Other definitions, explicit and implicit, may be included below.

Figure 1:
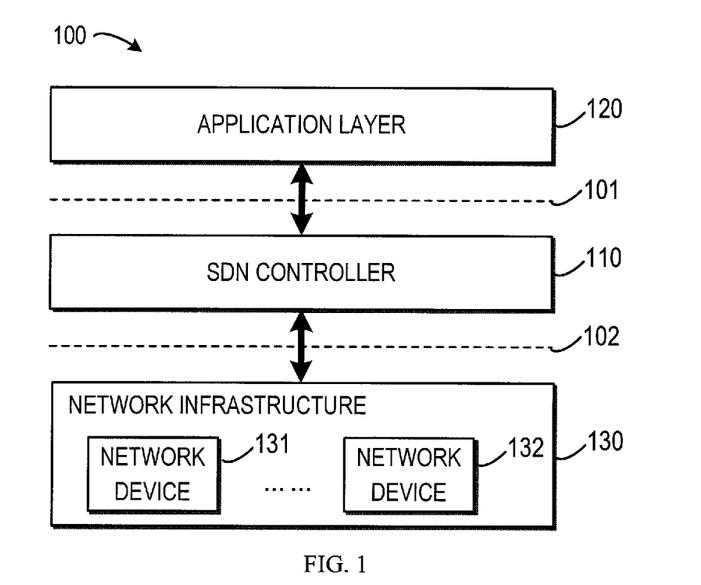
FIG. 1 shows an environment of an SDN 100 in which embodiments of the present disclosure may be implemented.

Reference is first made to FIG. 1, which illustrates an environment of SDN 100 in which embodiments of the present disclosure may be implemented. In the illustrated embodiment, the architecture of the SDN 100 includes an SDN controller 110 at a control player, an application layer 120 and a network infrastructure 130. As mentioned above, the control player may be referred to as a controller plane, SDN control layer or control plane; the application layer 120 may also be referred to as an application plane; and the network infrastructure 130 may be referred to as a data plane, resource layer or forwarding plane, depending on whether it is applied in ONF, ITU or IETF. The network infrastructure 130 includes network devices 131 and 132. It shall be understood, however, that more network devices can be included as part of the network infrastructure 130.

In one embodiment, the SDN controller 110 communicates with the application layer 120 via an interface 101 using protocols such as REST, Thrift and the like. Other protocols, however, can be utilized to implement the interface 101 without departing from the scope and spirit of the present disclosure. The interface 101 may be referred to as a northbound interface, an Application-Controller Plane Interface (A-CPI), a Service Interface, or an Application-Controller Interface, depending on the used protocol, technology or terminology.

In one embodiment, the SDN controller 110 communicates with network devices 131 and 132 of the network infrastructure 130 via an interface 102 using protocols such as ForCES, NETCONF, and I2RS. Other protocols, however, can be utilized to implement the interface 102 without departing from the scope and spirit of the present disclosure. The interface 102 may be referred to as a southbound interface, a Data-Controller Plane Interface (D-CPI), or a Resource-Controller Interface, depending on the used protocol, technology or terminology.

Conventionally, the SDN 100 does not reflect actual network behaviors and patterns and does not have any mechanism for resource utilization prediction and/or adjustment. Thus, when resources are oversubscribed, unexpected network behaviors may occur and have a negative effect on the performance of the SDN 100. In order to address this and other potential problems, embodiments of the present disclosure provide a solution for predicting utilization of resource(s) to be used in the network infrastructure so as to adjust network behaviors.

Figure 2:
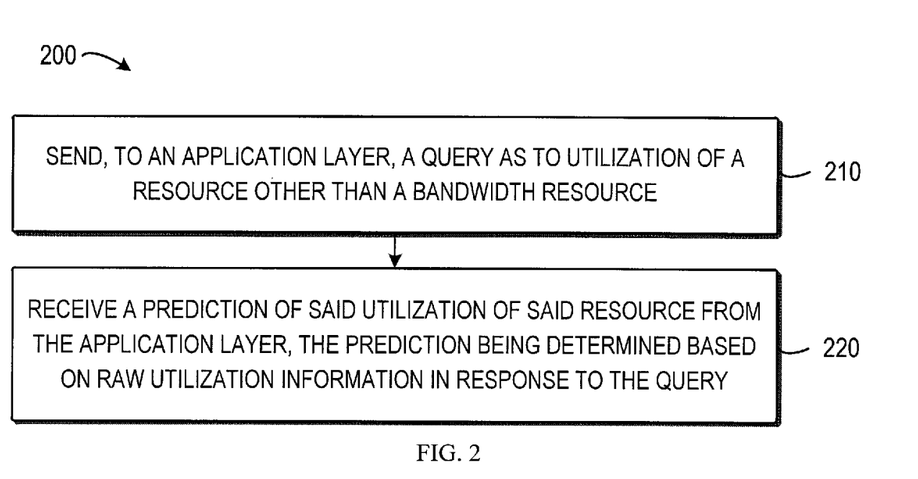
FIG. 2 shows a flowchart of a method 200 for determining resource utilization by an SDN controller in accordance with an embodiment of the present disclosure.

Now some exemplary embodiments of the present disclosure will be described below with reference to the accompanying figures. FIG. 2 shows a flowchart of a method 200 for determining resource utilization by an SDN controller in accordance with an embodiment of the present disclosure. With the method 200, the above and other potential deficiencies in the conventional approaches can be overcome. It would be appreciated by those skilled in the art that the method 200 may be implemented by a device in the control layer, such as the SDN controller 110 or other suitable device(s). For the purpose of illustration, the method 200 will be described below with reference to the SDN controller 110 as illustrated in FIG. 1.

The method 200 is entered in block 210, where the SDN controller 110 sends a query as to utilization of a resource to an application layer, for example the application layer 120 of FIG. 1. The resource for which the utilization is queried is to be used in the network infrastructure 130 of FIG. 1 and does not include a bandwidth resource.

In some embodiments, the SDN controller 110 may generate the query before sending it to the application layer 120. The query may be generated in several ways. For example, the query may be generated with regard to utilization of a resource to be used by an operation (also referred to as a "target operation") to be performed in the network infrastructure, utilization of a resource to be used at a certain time point (also referred to as a "target time point"), utilization of a resource to be used in association with a certain bandwidth (also referred to as a "target bandwidth"), utilization of a resource to be used in association with a certain temperature (also referred to as a "target temperature"), utilization of a resource to be used in association with certain humidity (also referred to as "target humidity"), and/or the like.

In some embodiments, the query may include information associated with the resource utilization, such as, an identification of the target operation, the target time point, the target bandwidth, the target temperature, the target humidity, and/or the like. Upon receipt of the query at the application layer 120, such information may be extracted and a prediction of the resource utilization may be obtained at the application layer 120 in correspondence to that information.

It is to be understood that the above examples of information associated with the resource utilization is illustrated for discussion, rather than limitation. Those skilled in the art would appreciate that there may be some other information that can be included in the query.

Next, in block 220, a prediction of the utilization of the resource is received from the application layer 120 at the SDN controller. The prediction is determined based on raw utilization information in response to the query. The prediction may be determined in a variety of ways in accordance with embodiments of the present disclosure. In some embodiments, the prediction may be determined according to a resource knowledge repository that is constructed from machine learning on raw utilization information received from the SDN controller 110. For example, the constructed resource knowledge repository may contain correspondence between a certain resource and utilization of that certain resource in various dimensions, such as at a certain time point, at a certain temperature/humility, and/or for a certain target operation. In some other embodiments, the prediction may be determined directly from Rote learning, which is a simple method used in machine learning, on the raw utilization information stored in a database. It is to be understood that the above examples are described for discussion, rather than limitation. Those skilled in the art may determine the prediction of the resource utilization in many other suitable ways.

In accordance with embodiments of the present disclosure, the raw utilization information may refer to information about resource utilization, such as operation, time duration, bandwidth, temperature, and humidity associated with historical resource utilization. In some embodiments, the SDN controller 110 may provide the raw utilization information to the application layer 120. The raw utilization information may include utilization of a resource used by a historical operation, utilization of a resource for a historical time duration, utilization of a resource associated with a certain bandwidth, utilization of a resource at a certain temperature, utilization of a resource associated with certain humidity, and/or the like. The historical operation is an operation that has been performed by one or more network devices in the network infrastructure 130. The utilization of a resource used by a historical operation indicates the resource utilization used when the historical operation is performed. The utilization of a resource for a historical time duration indicates the resource utilization used by the network device(s) in the network infrastructure 130 during the historical time duration. The utilization of a resource associated with a certain bandwidth indicates the utilization of resource(s) used when the bandwidth is occupied. The utilization of a resource at a certain temperature indicates the resource utilization corresponding to the temperature, and the utilization of a resource associated with certain humidity indicates the resource utilization corresponding to the humidity.

In some embodiments, in addition to the prediction of the utilization of the resource, the SDN controller 110 may receive information associated with the prediction from the application layer 120. The received information may include an identification of a target operation using the resource, a start time point of the target operation, an end time point of the target operation, a time duration of the target operation, a frequency band to be used by the target operation, a target time point when the resource is to be used, a target bandwidth, a target temperature, a target humidity, and/or the like.

In some embodiments, with the prediction of the resource utilization obtained in block 220, the SDN controller 110 may determine operability of an operation (referred to as a "target" hereafter) that is to use the resource, so as to determine whether the target operation is suitable to be performed, for example, on a network device 131 of the network infrastructure 130. In an embodiment, the SDN controller 110 may determine the operability based on the prediction of the utilization of the resource, and send an indication of the operability of the target operation to the network infrastructure 130.

In view of the forgoing, the SDN controller 110 can have the knowledge of prediction regarding utilization of resource(s) to be used in the network infrastructure 130 and accordingly manage operation(s) in the network infrastructure 130 in an effective way. In this way, a potential pattern of resource utilization can be predicted, and thus it is possible to obtain load balancing of network resources and detect malicious resource attacks.

Figure 3:
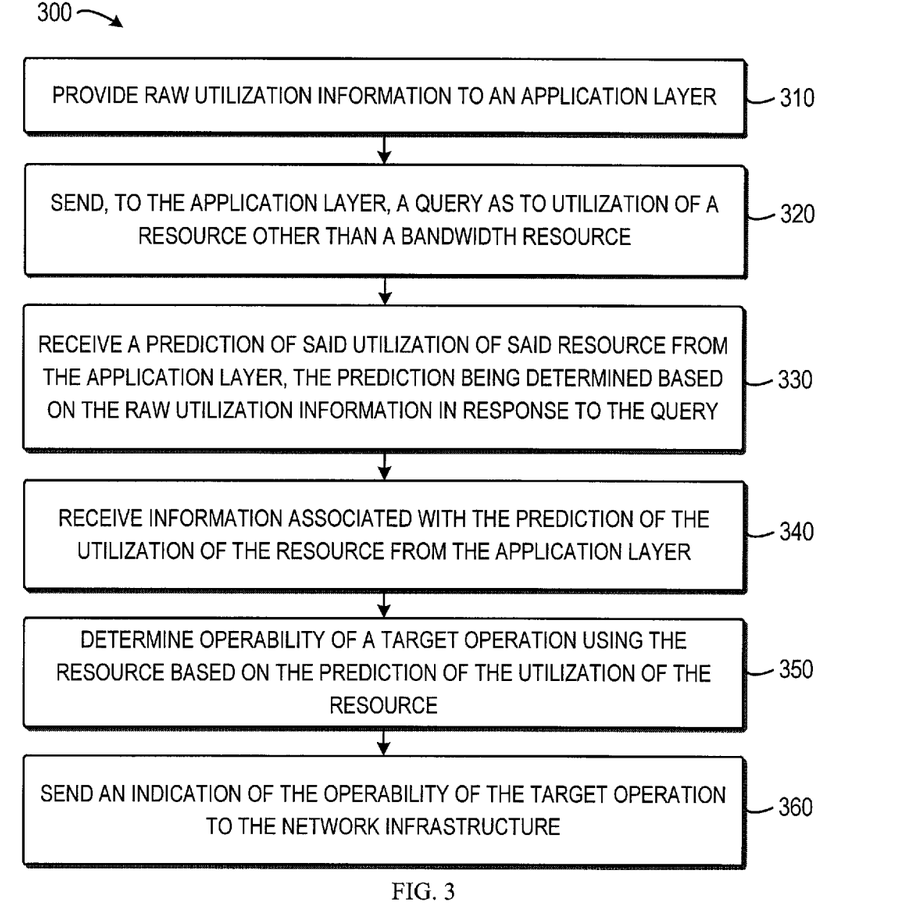
FIG. 3 shows a flowchart of a method 300 for determining resource utilization by an SDN controller in accordance with another embodiment of the present disclosure.

Now some example embodiments of determination of the resource utilization will be described. FIG. 3 is a flow chart of a method 300 for determining resource utilization by an SDN controller in accordance with another embodiment of the present disclosure. The method 300 can be considered as an implementation of the method 200. It is to be understood that the method 200 may be implemented in several ways as discussed above, and the method 300 is only one example instead of limitation.

The method 300 is entered in block 310, where the SDN controller provides the raw utilization information to the application layer. As discussed above, the raw utilization information may include information about utilization of a resource used by a historical operation, utilization of a resource for a historical time duration, utilization of a resource associated with a bandwidth, utilization of a resource at a temperature, utilization of resource associated with certain humidity, and so on.

In some embodiments, the SDN controller 110 may collect information about historical operations performed in the network infrastructure 130 and resource utilization associated with the historical operations. Then, the SDN controller 110 may determine the raw utilization information based on the collected information.

Alternatively, in some embodiments, the raw utilization information may be transmitted from the network infrastructure 130 to the SDN controller 110 through the interface 102, according to such protocols as Border Gateway Protocol (BGP), Network Configuration Protocol (Netconf), Path Computation Element Protocol (PCEP), and so on. The raw utilization information may be advertised in a solicited or unsolicited way. Then the raw utilization information may be sent through the interface 101, according to protocols such as REST, Thrift, as training data for machine learning in the application layer 120.

In block 320, the SDN controller 110 sends a query as to utilization of a resource to the application layer 120. According to embodiments of the present disclosure, the query may be implemented as a message sent from the SDN controller 110 to the application layer 120 via the interface 101. It is to be understood that this is just an example, rather than limitation. Those skilled in the art would appreciate that the query may be implemented in any suitable forms.

In block 330, the SDN controller 110 receives a prediction of the utilization of the resource from the application layer 120. As discussed above, for example, the prediction may be determined according to a resource knowledge repository constructed from machine learning on raw utilization information. The raw utilization information may be received at the application layer 120 from the SDN controller 110, and may include at least one of: utilization of a resource used by a historical operation, utilization of a resource for a historical time duration, utilization of a resource associated with a bandwidth, utilization of resource at a temperature, and utilization of a resource associated with certain humidity.

Machine learning is a type of artificial intelligence (AI) that provides computers with an ability to learn without being explicitly programmed. Machine learning focuses on the development of computer programs that can teach themselves to grow and change when exposed to new data. According to embodiments of the present disclosure, the raw utilization information may be used as training data for machine learning, and the resource knowledge repository may be constructed by for example, but not limited to, being generated, maintained and/or updated based on machine learning on the training data. It is to be understood that those skilled in the art could implement the machine learning in a variety of manners, which are not detailed here. The machine learning may be implemented on a single device or a plurality of coordinated devices in the application layer 120. In an example, the device(s) may iteratively modify parameters (for example, using a gradient descent algorithm) based on variances between output prediction and actual network pattern, so as to obtain a better prediction.

In some embodiments, machine learning may be performed by a device in the application layer 120, which may also be referred to as a network pattern analyzer. Multi-dimension training data including packet rate, volume, type and most of important, resource utilization may be continuously input into the network pattern analyzer, and a prediction algorithm may be executed to learn a current network pattern and deduct a future possible network pattern. Meanwhile, the network pattern analyzer may regularly read the newest predicted value so as to adjust a further output to approximate the real network pattern to the most extent.

Next, in block 340, the SDN controller 110 receives information associated with the prediction of the utilization of the resource from the application layer 120. The information associated with the prediction may be determined at the application layer 120 and may include, for example, but not limited to, an identification of a target operation using the resource, a start time point of the target operation, an end time point of the target operation, a time duration of the target operation, a frequency band to be used by the target operation, a target time point when the resource is to be used, a target bandwidth, a target temperature and target humidity.

According to embodiments of the present disclosure, the application layer 120 may send the information associated with the prediction together with the prediction of the utilization, or send them separately. Thus, the SDN controller 110 may receive the prediction and the information associated with the prediction together or separately.

In block 350, the SDN controller 110 determines operability of a target operation that is to use the resource based on the prediction of the utilization of that resource. The prediction indicates a predicted utilization of the resource to be used by the target operation. Thus, the SDN controller 110 may determine whether the target operation is suitable to be performed based on the prediction. For example, if the prediction of the utilization of the resource indicates that the predicted utilization of resource(s), e.g. storage resource, to be used by a target operation (for instance, Operation 5) is 99%, the SDN controller 110 may determine the Operation 5 is unsuitable to be performed since it would occupy too much resource, for example exceeding a predefined threshold 70% for the storage resource. In another example, if the prediction indicates that the predicted utilization of resource(s), e.g. computing resource, to be used by another target operation (for instance, Operation 6) is 66%, the SDN controller 110 may determine the Operation 6 is suitable to be performed since it does not exceed a predetermined threshold for the computing resource, for example, 80%. It is to be understood that the above threshold is just an example, rather than limitation. Those skilled in the art may set the threshold according to empirical values, system requirements, and/or other regulations.

In block 360, the SDN controller 110 sends an indication of the operability of the target operation to the network infrastructure. The indication may be implemented in various ways. In some embodiments, the indication may include an identification of the target operation together with the operability of the target operation (for example, "yes" or "no"). Thus, upon receipt of the indication, network device (s) in the network infrastructure 130 may understand that the target operation can (if the operability is "yes") be or cannot (if the operability is "no") be performed. It is to be understood that this is an example of the operability, rather than limitation. Those skilled in the art will understand that the operability may be denoted by "0" or "1", or in any other suitable forms that have been predefined at both the SDN controller 120 and the network infrastructure 130.

Alternatively, in some embodiments, the indication may include the identification of the target operation that is suitable to be performed. In this case, the operability of the target operation may not be included in the indication.

In addition or alternatively, in some embodiments, the indication may further include other items associated with the prediction of the resource utilization, for example, a start time point of the target operation, an end time point of the target operation, a time duration of the target operation, a frequency band to be used by the target operation, a target time point when the resource is to be used, a target bandwidth, a target temperature, target humidity, and so on. With these items, it is possible to use the indication to provide more information about the resource utilization to the network infrastructure 130, so that the operations performed by network device(s) in the network infrastructure 130 can be adjusted and optimized accordingly.

For instance, in an embodiment, the network infrastructure 130 may be adjusted by the SDN controller 110 for consequent network optimization, and/or send prediction deviations as feedback to the SDN controller 110 for adjusting of future prediction results.

Figure 4:
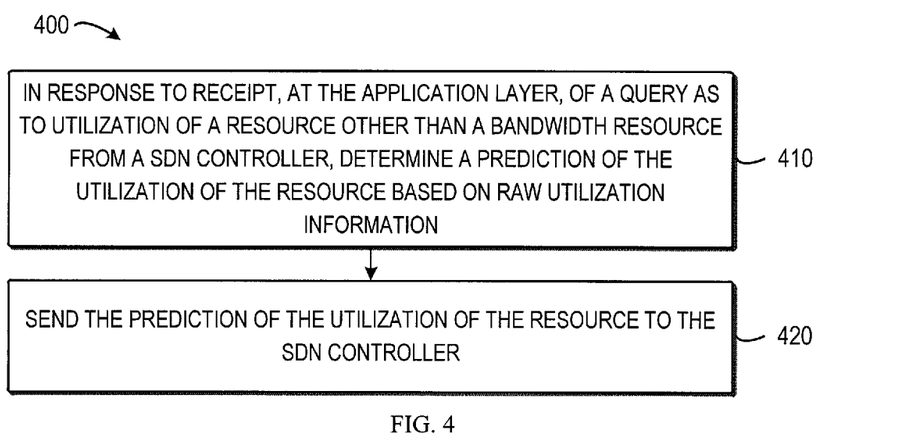
FIG. 4 shows a flowchart of a method 400 for determining resource utilization by a device in the application layer in accordance with an embodiment of the present disclosure.

In addition to the SDN controller, embodiments of the present disclosure also relate to the application layer 120, which will be described below with reference to FIG. 4. FIG. 4 shows a flowchart of a method 100 for determining resource utilization by a device in the application layer 120 in accordance with an embodiment of the present disclosure. With the method 400, the above and other potential deficiencies in the conventional approaches can be overcome.

The method 400 is entered in block 410, where in response to receipt, at the application layer, of a query as to utilization of a resource other than a bandwidth resource from an SDN controller, a prediction of the utilization of the resource is determined based on raw utilization information. The resource is to be used in a network infrastructure, and may include, for example, but not limited to energy, computing, storage, and/or the like. In some embodiments, the device (also referred to as the "first device" hereafter) receiving the query may be different from the device (also referred to as the "second device" hereafter) determining the prediction. In some other embodiments, the first device may be the same as the second device but different modules in that device are used to receive the query and to determine the prediction. In further embodiments, a same module in a device may be used to receive the query and determine the prediction.

Next, in block 420, the prediction of the utilization of the resource is sent to the SDN controller. The prediction may be determined in a variety of ways. In some embodiments, the prediction may be determined according to a resource knowledge repository as a knowledge database about the resource utilization. The database may provide standard Structured Query Language (SQL) operations include query, write, update, and so on, and may be used to store timely-refreshed prediction values and history prediction values.

The resource knowledge repository may be constructed from machine learning on the raw utilization information received from the SDN controller 110. The raw utilization information includes, for example, but not limited to, utilization of a resource used by a historical operation, utilization of a resource for a historical time duration, utilization of a resource associated with a bandwidth, utilization of resource at a temperature, and utilization of a resource associated with certain humidity.

In some embodiments, information associated with the prediction of the resource utilization may be further determined based on the resource knowledge repository. The information may include, but not limited to, an identification of a target operation using the resource, a start time point of the target operation, an end time point of the target operation, a time duration of the target operation, a frequency band to be used by the target operation, a target time point when the resource is to be used, a target bandwidth, a target temperature and target humidity. Then, the information may be send together with the prediction or separately to the SDN controller.

Figure 5:
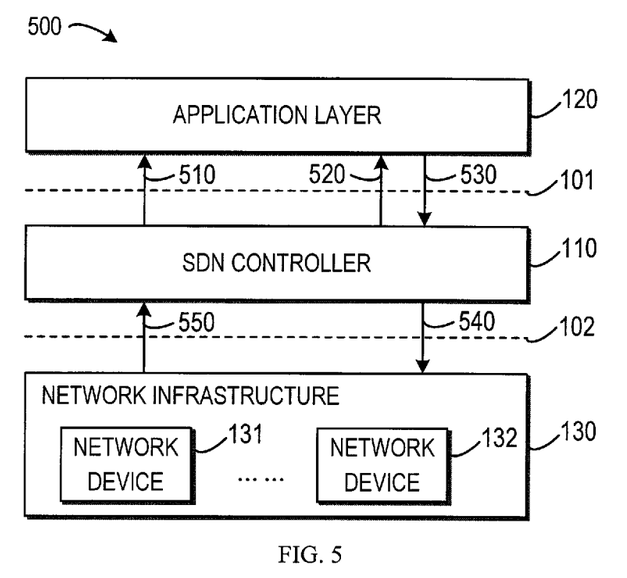
FIG. 5 shows a diagram 500 of a process for determining resource utilization in accordance with an embodiment of the present disclosure.

More details of the embodiments will be described with reference to FIG. 5, which shows a diagram 500 of an example process for determining resource utilization. As shown in FIG. 5, the SDN controller 110 provides 510 the raw utilization information to the application layer 120 via interface 101, e.g. northbound interface. In the example of FIG. 5, the raw utilization information may include three records, for example, "Operation 1, insert ACL entries, get resource used 75% at time point a,"

"Operation 2, insert ACL entries, get resource used 79% at time point b," and

"Operation 3, remove ACL entries, get resource used 63%, at time point c."

In the above example, "Operation 1," "Operation 2" and "Operation 3" represent identifications of historical operations that have been performed in the network infrastructure 130, respectively. In particular, Operation 1 is to "insert ACL entries" (which may be simplified as "insert") and has a resource utilization of 75% at time point a, Operation 2 is to "insert ACL entries" and has a resource utilization of 79% at time point b, and Operation 3 is to "remove ACL entries" (which may be simplified as "remove") and has a resource utilization of 63% at time point c.

Upon receipt of the raw utilization information from the SDN controller 110, device(s) in the application layer 120 may construct (for example, generate or update) the resource knowledge repository based on machine learning on the raw utilization information. The machining learning may be performed by the device in the application layer 120 that is the same as or different from the one receiving the raw utilization information. Those skilled in the art would appreciate that one or more devices in the application layer 120 may be employed to perform the machine learning to construct the resource knowledge repository. The resource knowledge repository may be kept in a storage device of the application layer 120 that can be accessed by the SDN controller 110.

Still referring to the embodiments of FIG. 5, in this example, the SDN controller 110 may want to know resource utilization when Operation 4 ("insert"), Operation 5 ("insert") or Operation 6 ("remove") are performed. Thus, the SDN controller 110 may send 520 a query as to utilization of a resource associated with these operations to the application layer 120 via interface 101, e.g. northbound interface.

Upon receipt of the query, a prediction of the resource utilization associated with the Operation 4, Operation 5, or Operation 6 may be determined at the application layer 120 and then corresponding predictions are sent from the application layer 120 to the SDN controller 110 via interface 101. In the example, the predictions may be implemented as follows:

Get: <Operation 4 insert>, <time point d>, <predicted resource utilization 77%>

Get: <Operation 5 insert>, <time point e>, <predicted resource utilization 99%>

Get: <Operation 6 remove>, <time point f>, <predicted resource utilization 66%>

Based on these predictions, the SDN controller 110 may understand that the predicted utilization of resource(s) to be used by Operation 4 (which is an operation of "insert") at the time point d is 77%, the predicted utilization of resource(s) to be used by Operation 5 (which is an operation of "insert") at the time point e is 99%, and the predicted utilization of resource(s) to be used by Operation 5 (which is an operation of "remove") at the time point f is 66%. Based on the prediction of the resource utilization, the SDN controller may determine operability of Operations 4-6 and send 540 an indication of the operability of these operations to the network infrastructure 130.

In the example of FIG. 5, since the predicted utilization of resource(s) to be used by Operation 5 is 99%, the SDN controller 110 may determine that Operation 5 is unsuitable to be performed. In the meanwhile, the SDN controller 110 may determine that Operations 4 and 6 are suitable to be performed because their resource utilizations are lower than a predetermined threshold, for example, 80%. Thus, the SDN controller 110 may send 540 an indication of the operability via interface 102 to the network infrastructure 130, for example indicating that Operation 5 cannot be performed while Operations 4 and 6 can be performed. In some embodiments, the indication may be implemented as including the following:

<Operation 4>, <time point d>, and

<Operation 6>, <time point e>.

Upon receipt of the indication, the network infrastructure 130 may understand that Operation 4 is suitable to be performed at the time point d and Operation 6 is suitable to be performed at the time point e. In turn, the network infrastructure 130 may then provide information about actual resource utilization of the operations performed in the network infrastructure 130 to the SDN controller 110 as a new source of the raw utilization information, in some embodiments.

Figure 6:
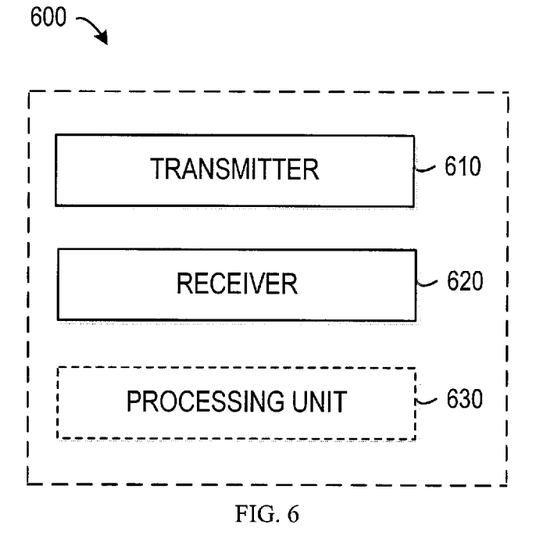
FIG. 6 shows a block diagram of an SDN controller 600 in accordance with an embodiment of the present disclosure.

FIG. 6 shows a block diagram of an SDN controller 600 in accordance with an embodiment of the present disclosure. It would be appreciated that the SDN controller 600 may be implemented as the SDN controller 110 as shown in FIG. 1 or other suitable devices.

As shown, the SDN controller 600 includes a transmitter 610 and a receiver 620. The transmitter 610 is configured to send, to an application layer, a query as to utilization of a resource other than a bandwidth resource, wherein the resource is to be used in a network infrastructure. The receiver 620 is configured to receive a prediction of the utilization of the resource from the application layer. The prediction is determined based on raw utilization information in response to the query.

In an embodiment, the transmitter 610 may be further configured to send the raw utilization information to the application layer. The raw utilization information may include at least one of: utilization of a resource used by a historical operation, utilization of a resource for a historical time duration, utilization of a resource associated with a bandwidth, utilization of a resource at a temperature, and utilization of resource associated with certain humidity.

In an embodiment, the SDN controller 600 may further include a processing unit 630 that is configured to generate the query as to at least one of: utilization of a resource to be used by a target operation to be performed in the network infrastructure, utilization of a resource to be used at a target time point, utilization of a resource to be used in association with a target bandwidth, utilization of a resource to be used in association with a target temperature, and utilization of a resource to be used in association with target humidity.

In an embodiment, the receiver 620 may be further configured to receive information associated with the prediction of the utilization of the resource from the application layer. The information includes at least one of: an identification of a target operation using the resource, a start time point of the target operation, an end time point of the target operation, a time duration of the target operation, a frequency band to be used by the target operation, a target time point when the resource is to be used, a target bandwidth, a target temperature and target humidity.

In an embodiment, the SDN controller 600 may further include a processing unit 630 configured to determine operability of a target operation that is to use the resource based on the prediction of the utilization of the resource. The operability indicates whether the target operation is suitable to be performed. In the embodiment, the transmitter 610 may be further configured to send an indication of the operability of the target operation to the network infrastructure.

In an embodiment, the resource may include at least one of: energy, computing capability and storage.

Figure 7:
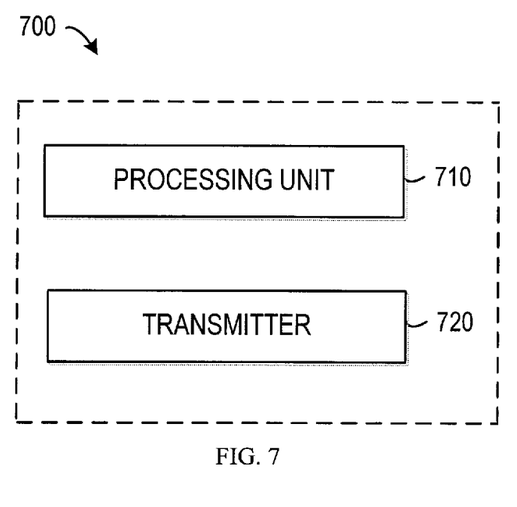
FIG. 7 shows a block diagram of a device 700 in the application layer in accordance with an embodiment of the present disclosure.

FIG. 7 shows a block diagram of a device 700 in the application layer in accordance with an embodiment of the present disclosure. It would be appreciated that the device 700 may be implemented in the application layer 120 as shown in FIG. 1.

As shown, the device 700 includes a processing unit 710 and a transmitter 720. The processing unit 710 is configured to, in response to receipt, at the application layer, of a query as to utilization of a resource other than a bandwidth resource from an SDN controller, determine a prediction of the utilization of the resource based on raw utilization information. The resource is to be used in a network infrastructure. The transmitter 720 is configured to send the prediction of the utilization of the resource to the SDN controller.

In an embodiment, the processing unit 710 may be further configured to determine the prediction of the utilization of the resource according to a resource knowledge repository. The resource knowledge repository may be constructed from machine learning on the raw utilization information received from the SDN controller. The raw utilization information includes at least one of: utilization of a resource used by a historical operation, utilization of a resource for a historical time duration, utilization of a resource associated with a bandwidth, utilization of resource at a temperature, and utilization of a resource associated with certain humidity.

In an embodiment, the processing unit 710 may be further configured to determine information associated with the prediction of the utilization of the resource based on the resource knowledge repository. The information includes at least one of: an identification of a target operation using the resource, a start time point of the target operation, an end time point of the target operation, a time duration of the target operation, a frequency band to be used by the target operation, a target time point when the resource is to be used, a target bandwidth, a target temperature and target humidity. In the embodiment, the transmitter 720 may be further configured to send the information to the SDN controller.

In an embodiment, the resource may include at least one of: energy, computing capability and storage.

It should be appreciated that components included in the device 600 correspond to the operations of the method 200, and components included in the device 700 correspond to the operations of the method 300. Therefore, all operations and features described above with reference to FIG. 2 are likewise applicable to the components included in the device 600 and have similar effects, and all operations and features described above with reference to FIG. 3 are likewise applicable to the components included in the device 700 and have similar effects. For the purpose of simplification, the details will be omitted.

The components included in the SDN controller 600 and the device 700 may be implemented in various manners, including software, hardware, firmware, or any combination thereof. In one embodiment, one or more units may be implemented using software and/or firmware, for example, machine-executable instructions stored on the storage medium. In addition to or instead of machine-executable instructions, parts or all of the components included in the SDN controller 600 and the device 700 may be implemented, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), and the like.

Figure 8:
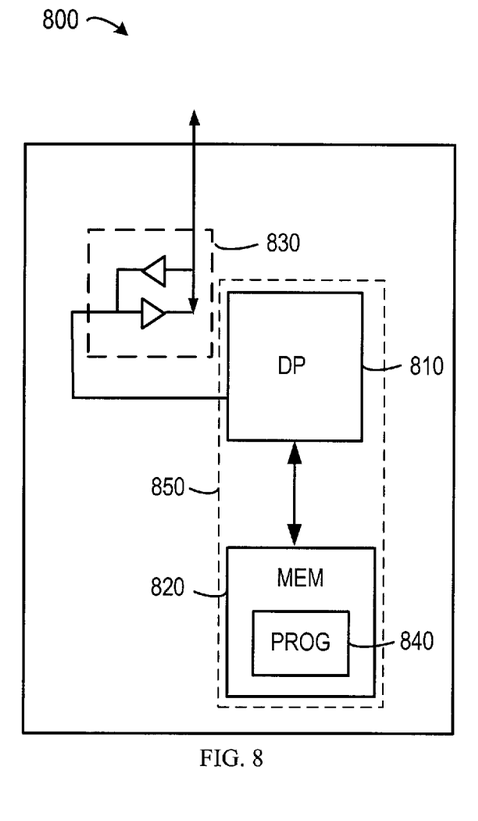
FIG. 8 shows a simplified block diagram 800 of a device that is suitable for use in implementing embodiments of the present disclosure.

FIG. 8 shows a simplified block diagram of a device 800 that is suitable for implementing embodiments of the present disclosure. It would be appreciated that the device 800 may be implemented as at least a part of, for example, the SDN controller 600 and the device 700 in the application layer.

As shown, the device 800 includes a communicating means 830 and a processing means 850. The processing means 850 includes a data processor (DP) 810, a memory (MEM) 820 coupled to the DP 810. The communicating means 830 is coupled to the DP 810 in the processing means 850. The MEM 820 stores a program (PROG) 840. The communicating means 830 is for communications with other devices in the same or different layer.

The PROG 840 is assumed to include program instructions that, when executed by the associated DP 810, enable the device 800 to operate in accordance with the embodiments of the present disclosure, as discussed herein with the method 200, 300 or 400. The embodiments herein may be implemented by computer software executable by the DP 810 of the device 800, or by hardware, or by a combination of software and hardware. A combination of the data processor 810 and MEM 820 may form processing means 850 adapted to implement various embodiments of the present disclosure.

The MEM 820 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in the device 800, there may be several physically distinct memory modules in the device 800. The DP 810 may be of any type suitable to the local technical environment, and may include one or more of general purpose computers, special purpose computers, microprocessors, digital signal processors (DSPs) and processors based on multicore processor architecture, as non-limiting examples. The device 800 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

By way of example, embodiments of the present disclosure can be described in the general context of machine-executable instructions, such as those included in program modules, being executed in a device on a target real or virtual processor. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. The machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

In the context of this disclosure, the device may be implemented in the general context of computer system-executable instructions, such as program modules, being executed by a computer system. Generally, program modules may include routines, programs, objects, components, logic, data structures, and so on that perform particular tasks or implement particular abstract data types. The device may be practiced in distributed cloud computing environments where tasks are performed by remote processing devices that are linked through a communications network. In a distributed cloud computing environment, program modules may be located in both local and remote computer system storage media including memory storage devices.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method implemented at a Software-Defined Networking, SDN, controller, comprising:
   providing the raw utilization information to an application layer, the raw utilization information including at least one of utilization of a resource used by a historical operation, utilization of a resource for a historical time duration, utilization of a resource associated with a bandwidth, utilization of a resource at a temperature, and utilization of resource associated with certain humidity;
   sending, to the application layer, a query as to utilization of a resource other than a bandwidth resource, wherein said resource is to be used in a network infrastructure;
   receiving a prediction of said utilization of said resource from said application layer, said prediction being determined based on raw utilization information in response to said query,
   wherein said prediction of said utilization of said resource is associated with information including at least one of: an identification of a target operation using said resource, a start time point of said target operation, an end time point of said target operation, a time duration of said target operation, a frequency band to be used by said target operation, a target time point when said resource is to be used, a target bandwidth, a target temperature and a target humidity;

determining operability of a target operation using a said resource based on said predication of said utilization of said resource, said operability indicating whether said target operation is suitable to be performed; and sending an indication of said operability of said target operation to said network infrastructure.

2. The method according to claim 1, further comprising:
generating the query as to at least one of: utilization of a resource to be used by a target operation to be performed in the network infrastructure, utilization of a resource to be used at a target time point, utilization of a resource to be used in association with a target bandwidth, utilization of a resource to be used in association with a target temperature, and utilization of a resource to be used in association with a target humidity.

3. The method according to claim 1, wherein said resource includes at least one of: energy, computing capability and storage.

4. A method implemented at a device in an application layer, comprising:

in response to receipt, at the application layer, of a query as to utilization of a resource other than a bandwidth resource from a Software-Defined Networking, SDN, controller, determining a prediction of said utilization of said resource based on raw utilization information received from the SDN controller, wherein said resource is to be used in a network infrastructure, wherein the raw utilization information includes at least one of: utilization of a resource used by a historical operation, utilization of a resource for a historical time duration, utilization of a resource associated with a bandwidth, utilization of resource at a temperature, and utilization of a resource associated with certain humidity, wherein said predication of said utilization of said resource is associated with information including at least one of: an identification of a target operation using said resource, a start time point of said target operation, an end time point of said target operation, a time duration of said target operation, a frequency band to be used by said target operation, a target time point when said resource is to be used, a target bandwidth, a target temperature and target humidity; and sending said prediction of said utilization of said resource to said SDN controller.

5. The method according to claim 4, wherein determining said prediction of said utilization of said resource comprises:

determining said prediction of said utilization of said resource according to a resource knowledge repository, the resource knowledge repository being constructed from machine learning on the raw utilization information received from the SDN controller.

6. The method according to claim 4, wherein said resource includes at least one of: energy, computing capability and storage.

7. A Software-Defined Networking, SDN, controller, comprising:

a circuitry and a memory, the memory containing a program including instructions executable by the circuitry, the circuitry being configured to cause the SDN controller to perform the method implemented at a Software-Defined Networking, SDN, controller, comprising:

providing the raw utilization information to an application layer, the raw utilization information including at least one of utilization of a resource used by a historical operation, utilization of a resource for a historical time duration, utilization of a resource associated with a bandwidth, utilization of a resource at a temperature, and utilization of resource associated with certain humidity;

sending, to the application layer, a query as to utilization of a resource other than a bandwidth resource, wherein said resource is to be used in a network infrastructure;

receiving a prediction of said utilization of said resource from said application layer, said prediction being determined based on raw utilization information in response to said query, wherein said prediction of said utilization of said resource is associated with information including at least one of: an identification of a target operation using said resource, a start time point of said target operation, an end time point of said target operation, a time duration of said target operation, a frequency band to be used by said target operation, a target time point when said resource is to be used, a target bandwidth, a target temperature and a target humidity;

determining operability of a target operation using a said resource based on said predication of said utilization of said resource, said operability indicating whether said target operation is suitable to be performed; and sending an indication of said operability of said target operation to said network infrastructure.

8. A computer program product being tangibly stored on a computer readable storage medium and including instructions which, when executed on a processor of a Software-Defined Networking, SDN, controller, cause the SDN controller to perform the method according to claim 1.

9. A device, comprising:

a circuitry and a memory, the memory containing a program including instructions executable by the circuitry, the circuitry being configured to cause the device to perform the method according to claim 4.

10. A computer program product being tangibly stored on a computer readable storage medium and including instructions which, when executed on a processor of a device, cause the device to perform the method according to claim 4.

* * * * *